United States Patent
Rasmussen et al.

(10) Patent No.: US 12,269,545 B2
(45) Date of Patent: Apr. 8, 2025

(54) SELF-ADJUSTING BIKE RACK

(71) Applicant: Rudy Rack, Inc., Stevens Point, WI (US)

(72) Inventors: Don Rasmussen, Stevens Point, WI (US); Mark William Messing, Rosholt, WI (US)

(73) Assignee: Rudy Rack, Inc., Stevens Point, WI (US)

( * ) Notice: Subject to any disclaimer, the term of this patent is extended or adjusted under 35 U.S.C. 154(b) by 0 days.

(21) Appl. No.: 18/062,334

(22) Filed: Dec. 6, 2022

(65) Prior Publication Data
US 2023/0192205 A1  Jun. 22, 2023

Related U.S. Application Data

(60) Provisional application No. 63/265,739, filed on Dec. 20, 2021.

(51) Int. Cl.
*B62H 3/04* (2006.01)
(52) U.S. Cl.
CPC ..................... *B62H 3/04* (2013.01)
(58) Field of Classification Search
CPC ... B62H 3/12; B62H 3/02; B62H 3/00; B62H 3/10; B62H 3/04; A47F 5/0807; A47F 5/0838
See application file for complete search history.

(56) References Cited

U.S. PATENT DOCUMENTS

| | | | | |
|---|---|---|---|---|
| 256,936 | A * | 4/1882 | Wicksteed | B62H 3/04 211/24 |
| 322,057 | A * | 7/1885 | Hart | B62H 3/04 211/21 |
| 595,891 | A * | 12/1897 | Robertson | B62H 3/08 211/20 |
| 5,692,659 | A * | 12/1997 | Reeves | B60R 9/06 224/536 |
| 6,455,869 | B1 * | 9/2002 | Cook | B62H 3/04 257/133 |
| 6,460,743 | B2 * | 10/2002 | Edgerly | B60R 9/048 224/571 |
| 6,640,979 | B1 * | 11/2003 | Mayfield | B62H 3/04 211/20 |
| 6,868,998 | B2 * | 3/2005 | Dean | B62H 3/08 224/924 |
| 7,150,359 | B1 * | 12/2006 | Lyons | B62H 3/08 211/20 |
| 7,958,973 | B2 * | 6/2011 | Swasand | B60T 3/00 188/32 |
| 9,610,993 | B1 * | 4/2017 | Ho | B62H 3/06 |
| 9,650,092 | B1 * | 5/2017 | Tsai | B62H 3/08 |
| 10,525,897 | B2 * | 1/2020 | Lathrop | B62H 3/08 |

(Continued)

*Primary Examiner* — Ko H Chan
(74) *Attorney, Agent, or Firm* — Boyle Fredrickson, SC

(57) ABSTRACT

A display rack for bicycles provides opposed wheel cups for engaging the periphery of a bicycle wheel where one wheel cup is mounted to a pivoting lever that is pressed downward on one end by the weight of the bicycle tire to move the wheel cups together providing a gravity actuated clamping that is released when the bicycle is lifted. One or more wheel cups may extend in a channel measured in a tangent to the bicycle wheel to prevent locking to knob bicycle tires.

6 Claims, 3 Drawing Sheets

(56) References Cited

U.S. PATENT DOCUMENTS

| | | | |
|---|---|---|---|
| 2003/0010729 A1* | 1/2003 | Lopez De Luzuriaga | ................... B62H 3/04 211/17 |
| 2007/0068881 A1* | 3/2007 | Caponette | ................ B62H 3/04 211/20 |
| 2017/0210437 A1* | 7/2017 | Black | ................... B60B 19/003 |
| 2021/0147022 A1* | 5/2021 | Kuschmeader | .......... B62H 3/08 |

* cited by examiner

SELF-ADJUSTING BIKE RACK

CROSS REFERENCE TO RELATED APPLICATION

This application claims the benefit of U.S. provisional application 63/265,739 filed Dec. 20, 2021 and hereby incorporated by reference.

STATEMENT REGARDING FEDERALLY SPONSORED RESEARCH OR DEVELOPMENT

--

BACKGROUND OF THE INVENTION

The present invention relates to racks for supporting bicycles for display or parking and in particular to a rack providing improved alignment of the supported bicycle.

Bicycle racks for efficiently storing or displaying bicycles may use a structure providing a slot for receiving a tire of the bicycle so that the bicycle can be supported in a generally vertical orientation (with the wheels aligned with a vertical plane). Generally, the width of common bicycle tires may vary substantially between bicycles, requiring that the width of the slot with for such racks to be oversized. A bicycle with a narrower tire than the oversized slot may lean to one side interfering with other bicycles in adjacent slots or producing an unkempt appearance in a retail environment.

Bicycle racks that provide points of frictional contact between the bike tire and the rack, for example, frictional contact at between the bike tire and a front and rear surface of the slot and between the bike tire and the ground beneath the slot, can potentially address this problem, but require that the slot be properly configured in size and placed at a proper elevation above the ground to closely match the tire radius. This approach can also be rendered ineffective in the face of multiple different tire radii commonly found on bicycles.

SUMMARY OF THE INVENTION

The present invention provides a bike rack that automatically adjusts to accommodate bike tires of different radii and thicknesses. In the invention, the weight of the bicycle tire against a lever on the rack moves the lever to apply three separated points of contact for a range of different bike tires with different radii. The contact points provide concave surfaces closely capturing the sides of the tire for a range of different tire widths, effectively presenting properly sized supporting slots. The result is a rack that better holds the bike in a vertical position without manual adjustment of the rack, for bikes having tires of a wide range of radii and thicknesses. Lifting the bicycle tire upward releases the weight on the lever and opens the rack, making it easy to insert and remove bicycles, for example, compared to an actual closely fitting slot.

These particular objects and advantages may apply to only some embodiments falling within the claims and thus do not define the scope of the invention.

DETAILED DESCRIPTION OF THE PREFERRED EMBODIMENT

Figure 1:
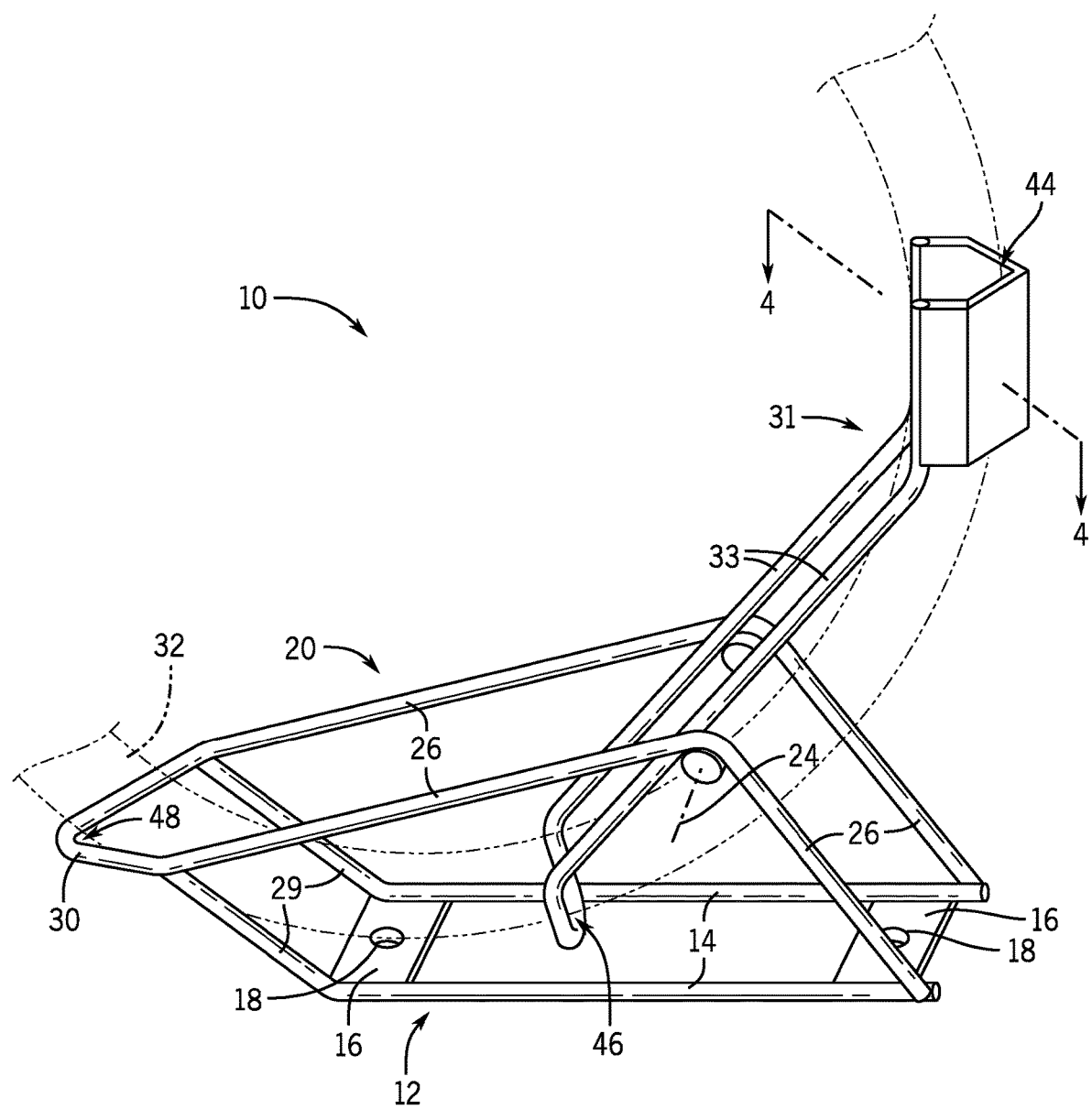
FIG. 1 is a perspective view of a rack element (being one of multiple parallel, arrayed elements in a typical rack) showing a bike tire in phantom providing three points of bike tire contact.
Figure 2:
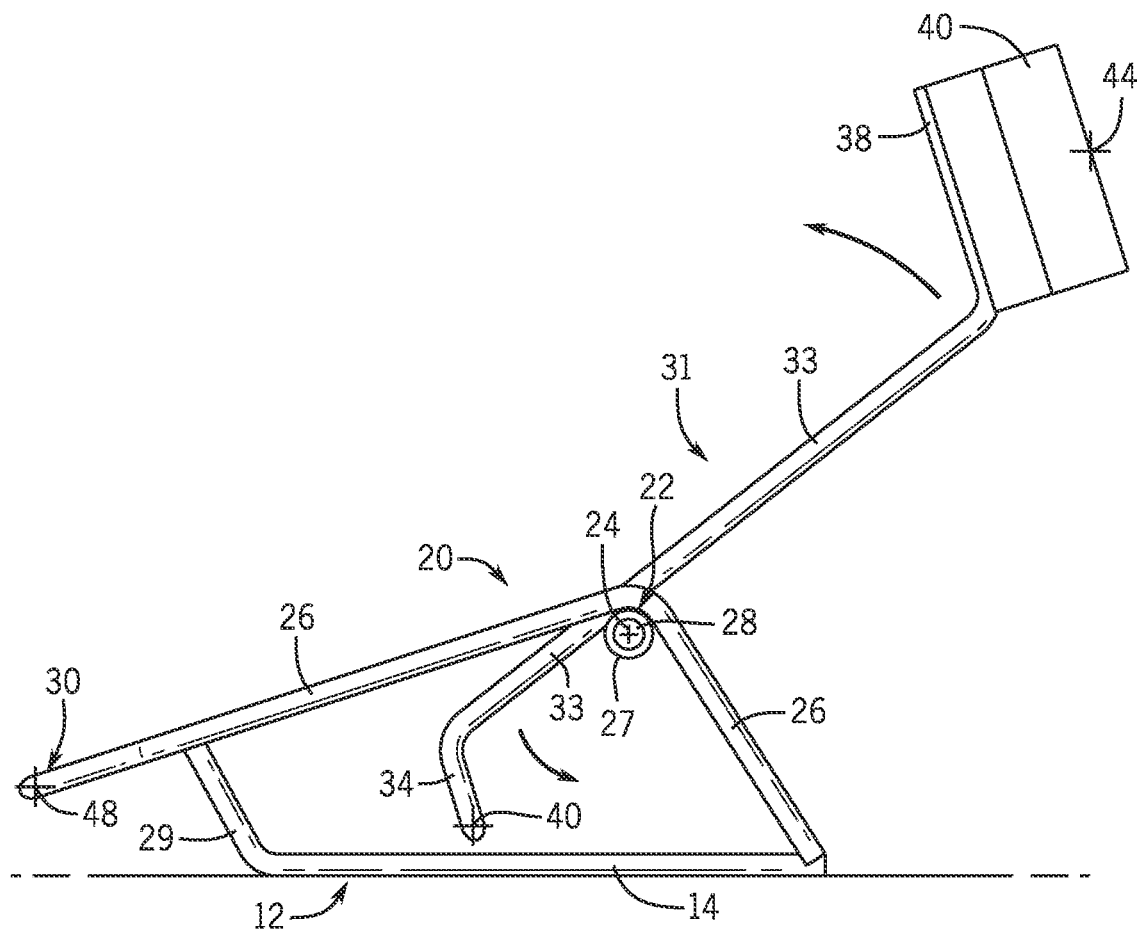
FIG. 2 is a side elevational view of the bike rack of FIG. 1 showing a pivoting lever offering two of the three contact points.

Referring now to FIGS. 1 and 2, a self-adjusting bike stand 10 of the present invention may provide a base 12 having first and second longitudinally extending parallel rails 14, for example, nominally ½-inch diameter steel rods, extending between and flanking mounting plates 16 welded thereto. The mounting plates 16 may provide central mounting holes 18 allowing the mounting plates and hence the base 12 to be attached, for example, by lag screws, bolts, or the like, to a horizontal platform (not shown) and thereby to be assembled with other bike stands 10 arrayed transversely in parallel orientation to create a multi-bike stand (not shown).

A pair of parallel, spaced apart rods 26, for example, also ½-inch diameter steel rods, may be welded to and extend upwardly from respective of the rails 14 at a rear of the base 12. These rods 26 may then bend forward, to extend horizontally and downwardly toward but above a front of the base 12. The rails 14 at the front of the base 12 may continue forward and upwardly to connect with the undersurface of the forwardly extending rods 26 (for example, by welding) providing buttresses 29 that complete a robust support of the rods 26 at two points for each rod 26.

The bend in the rods 26 above the base 12 provides a pivot support 20 supporting a pivot bearing 22 above the base 12 displaced toward the rear edge of the base 12. The pivot bearing 22 defines a generally horizontal transverse pivot axis 24 and include a tubular cylindrical sleeve 27 welded to an underside of the respective pivot support 20 above the rear portion of the base 12 and a coaxial internal trunnion 28 which will be described further below and which may pivot within the cylindrical sleeve 27.

The rods 26 may have a transverse separation from each other greater than a largest expected width of common tires (e.g., nominally 3½ inches) being an expected largest tire width of 3 inches plus a one inch clearance to accommodate an internal lever structure to be described below.

The rods 26 may continue past their contact with the buttresses 29 forward beyond the base 12 but above the plane of the base 12 to then curve together to join at an apex point 30 presenting a rearwardly concave surface that may receive a front surface of a bike tire 32.

Positioned between the rods 26 and supported by the pivot bearings is a lever 31 formed of transversely spaced apart and parallel lever rods 33 separated by an amount greater than the maximum expected width of common bike tires (3 inches). The left and right lever rods 33 are welded to the trunnions 28 so that the lever rods 33 may pivot within a vertical plane about the pivot axis 24 and so that the lever rods 33 extend forwardly and rearwardly from that pivot axis 24.

The ends of the rods 33 extend forwardly from the pivot axis 24 band downwardly toward the base 12 and then inwardly to be joined to each other to create an upwardly concave U-bend 34 sized to receive a lower surface of a bike tire 32.

The rear ends of the rods 33 extending rearwardly from the pivot axis 24 are bent sharply upwardly providing tangent bars 38 generally tangential to an inserted bike tire 32 that may attached to a channel collar 40. The channel collar 40 may provide a trough formed of a plate of steel and presenting a forwardly concave and generally upwardly extending U-shaped channel approximately 4 inches long. The channel collar 40 provides outwardly extending lips welded to the tangent bars 38 and extends rearwardly from the tangent bars 38 to receive therein a rear surface of a bike tire 32.

Generally, a length of the rods 33 forward from the pivot axis 24 to the U-bend 34 will be approximately one third of the distance between the pivot axis 24 and the collar 40 although these dimensions may be readily adjusted to ensure that weight of bicycle on U-bend 34 brings collar 40 into close abutment with the rear of the tire 32 for a range of tire weights and sizes commonly encountered. Desirably, with a bike and hence the bike tire 32 removed from the bike stand 10, the lever 31 will rotate clockwise under the force of imbalance to present a larger opening for a bike tire 32 to be received.

Figure 3:
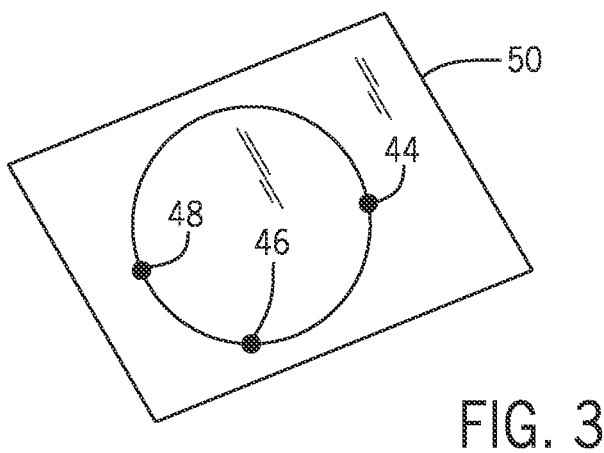
FIG. 3 is a geometric representation of three contact points which define a plane of alignment for a bike tire.

Referring now to FIG. 3, it will be understood generally that frictional contact between the bike tire 32 and collar 40 (forming a first contact point 44), between the bike tire 32 and the U-bend 34 (forming a second contact point 46), and between the bike tire 32 and the apex point 30 (forming a third contact point 48) will provide three non-collinear contact points that accurately define a plane 50 constraining orientation of the bike tire 32 to a substantially vertical plane thus ensuring proper alignment of the bike. It will be further appreciated that movement of the lever 31 allows these contact points to be made for bike tires 32 of a variety of different radii, with tires of smaller radius being accommodated by a counterclockwise rotation of the lever 31 as shown in FIG. 2, and larger radius bike tires being accommodated by a clockwise rotation of lever 31 as shown in FIG. 2.

Figure 4:
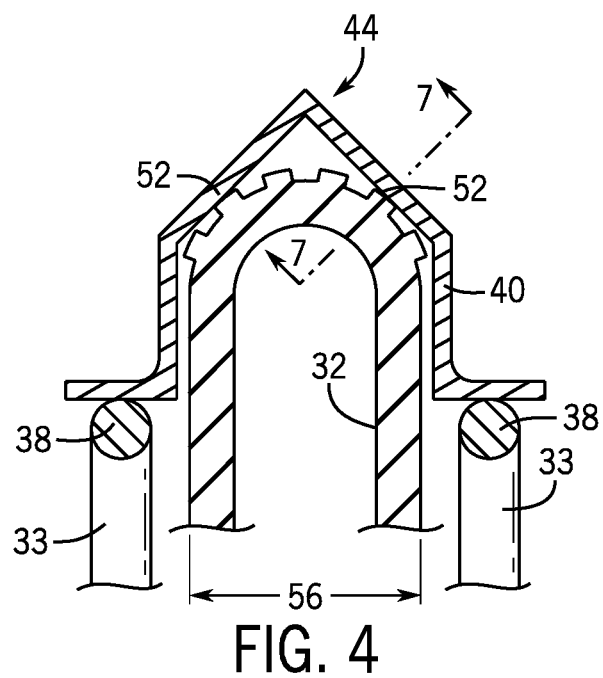
FIG. 4 is a planar cross-section taken along line 4-4 of FIG. 1 showing a collar presenting a first contact point with the bike tire having a concave trough extending tangentially to the tire periphery such as presents an effective variable width slot accommodating tires of different widths without catching on tire knobs.

Referring now to FIG. 4, the concave surface presented by the collar 40 providing first contact point 44 when closely pressed against the tire 32 by the rotating action of the lever 31 provides lateral or side contact regions 52 for tires of various widths thus effectively eliminating the problem of an oversized slot width when needing to accommodate tires with different widths. In other words, the closely conforming concave surface provides an effective, properly narrow slot width despite the generally wide separation between the lever rods 33 along the majority of their length.

Figure 5:
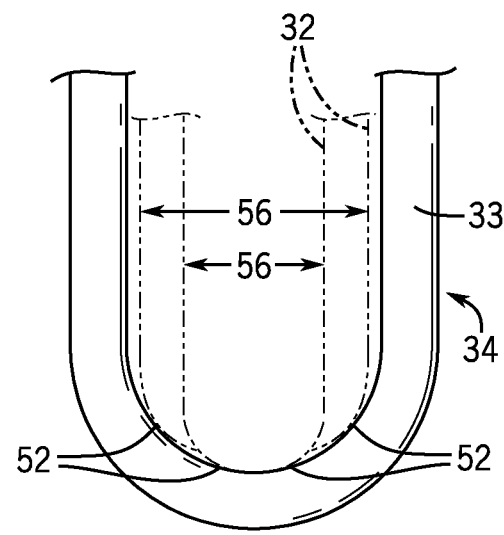
FIG. 5 is a figure showing the second contact point also providing a concave surface presenting effective different slot widths for different tire widths when pressed against the tire.
Figure 6:
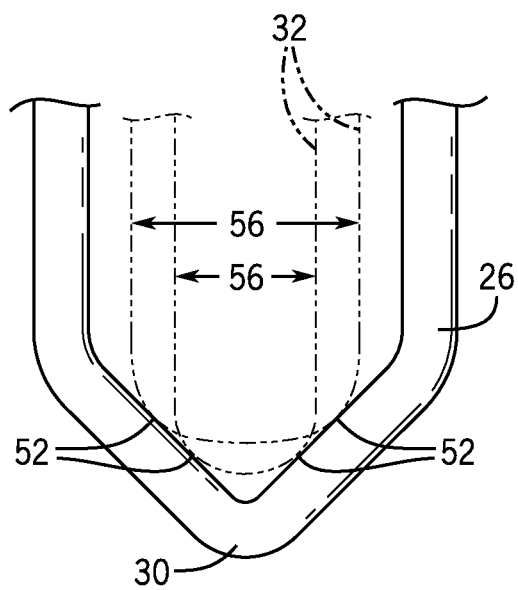
FIG. 6 is a figure similar to that of FIG. 5 showing a third contact point also presenting a concave surface offering different effective slot widths for different tire widths.

Similarly referring to FIGS. 5 and 6, the concave surfaces of the U-bend 34 and of the apex point 30, when drawn closely against the outer periphery of the bike tire 32, provide lateral slot-like contact for different widths 56 of tires within a range of expected tire sizes.

Figure 7:
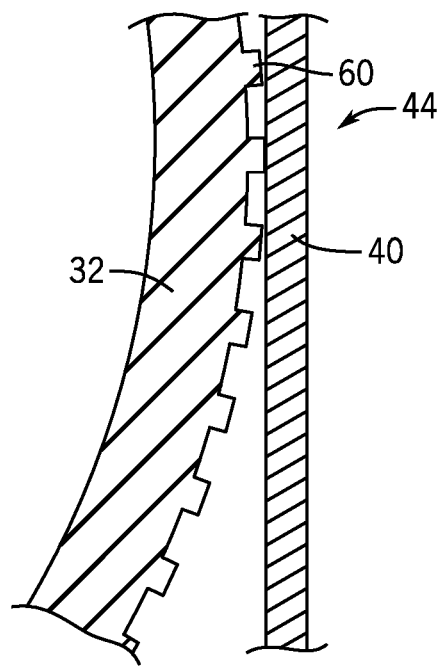
FIG. 7 is an elevational cross-section along line 7-7 of FIG. 4 showing the action of the collar in preventing capture between knobs, for example, of a mountain bike tire.

Referring again to FIG. 4 and to FIG. 7, the elongate planar surfaces of the channel collar 40 serve to prevent a capture of the collar 40 between knobs 60, for example, of a mountain bike tire or the like, such as would prevent its free rotation for removing the bike tire 32. This can be contrasted to a situation where the collar 40 is replaced with a bent rod like U-bend 34 which might be entrapped between knobs 60 against rotation requiring a sliding along the periphery of the bike tire 32.

While the present invention uses a relatively simple gravity-based biasing of the lever 31, the invention contemplates that spring biasing or other biasing techniques may also be used when the additional complexity can be accommodated.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

What we claim is:

1. A display rack for supporting a bicycle comprising:
   a support frame having a base adapted to attach to a stationary supporting structure and holding a pivot, the pivot defining a horizontal pivot axis above the base, the support frame further having a first wheel cup positioned forward from the pivot axis to receive and engage sides of an outer periphery of a first portion of a bicycle wheel; and a wheel trap supported by the pivot to pivot thereabout, the wheel trap extending rearwardly from the pivot to a second wheel cup for engaging sides of an outer periphery of a second portion of the bicycle wheel and the wheel trap further extending forwardly from the pivot to a treadle portion positioned between the first wheel cup and second wheel cup to receive weight of the bicycle wheel to pivot the wheel trap to move the first wheel cup and second wheel cup toward each other clamping the bicycle wheel; and wherein the pivot provides left and right portions separated by a gap, the gap sized so that the outer periphery of the bicycle wheel can pass through the gap and across the pivot axis to a position where the outer periphery of the bicycle wheel is supported below the pivot axis.

2. The display rack of claim 1 wherein the first and second wheel cups present concave surfaces adapted to contact side surfaces of an outer periphery of a bicycle tire for various bicycle tire widths.

3. The display rack of claim 1 wherein at least one of the first and second wheel cups provides a trough extending tangentially to the outer periphery of the bicycle wheel by at least 1 inch when contacting the bicycle wheel.

4. The display rack of claim 1 wherein the base provides downwardly extending mounting holes for attaching the base to a horizontal surface with fasteners extending downwardly through the mounting holes into the horizontal surface.

5. The display rack of claim 1 wherein the first wheel cup is formed of a curved metal rod.

6. The display rack of claim 1 wherein the support frame provides an upwardly extending left and right sides joined together at the first wheel cup and providing opposed horizontal supports for the pivot and wherein the wheel trap provides left and right sides fitting within the left and right sides of the support frame and joined by the treadle portion and second wheel cup.

* * * * *